Sept. 15, 1925.                                         1,553,794
                  G. A. WOOD ET AL
              PROCESS OF MAKING HAND TOOLS
                   Filed March 5, 1925
Fig. 1.                    Fig. 2.
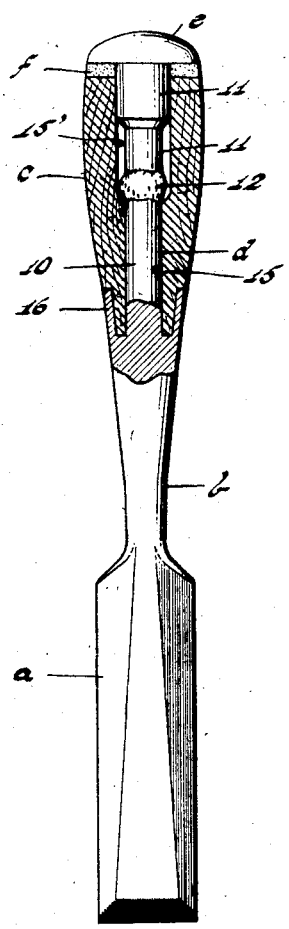
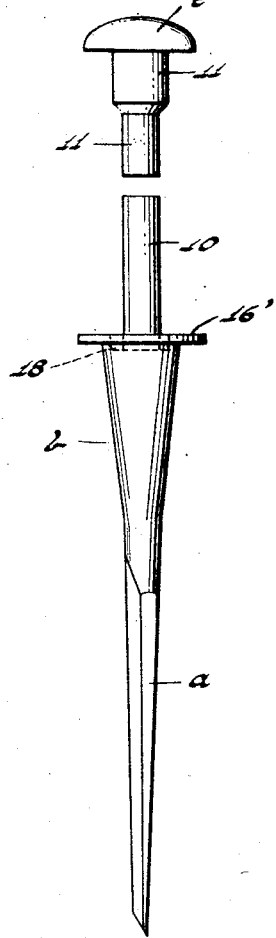
Inventor
George A. Wood
George E. Wood
By Clay Lindsey
Their Attorney Patented Sept. 15, 1925.

1,553,794

UNITED STATES PATENT OFFICE.

GEORGE A. WOOD AND GEORGE E. WOOD, OF SOUTHINGTON, CONNECTICUT, ASSIGNORS TO THE STANLEY WORKS, OF NEW BRITAIN, CONNECTICUT, A CORPORATION OF CONNECTICUT.

PROCESS OF MAKING HAND TOOLS.

Application filed March 5, 1925. Serial No. 13,329.

*To all whom it may concern:*

Be it known that we, GEORGE A. WOOD and GEORGE E. WOOD, citizens of the United States, and residents of Southington, in the county of Hartford, State of Connecticut, have invented certain new and useful Improvements in Processes of Making Hand Tools, of which the following is a specification.

This invention relates to the manufacture of hand tools of the type provided with a handle through which extends a shank having on one end a head and on the other end a bolster with a ferrule in which one end of the handle fits. In the present illustrative disclosure, we have shown, by way of exemplification, a chisel manufactured in accordance with the present invention, but it is to be understood that our improved method may be employed for manufacturing tools other than chisels, as, for example, screw drivers.

In accordance with the present invention, we provide an improved method for manufacturing tools of this sort, the method being such that it may be easily and economically carried out and result in a hand tool characterized by its extreme strength and durability. More particularly, the shank, which extends through the bore of the handle, is formed of two parts or stems, one of which is constructed integrally with the head and the other of which is constructed integrally with the bolster, and these stems are united or welded together within the bore of the handle. By proceeding in accordance with the present invention, the metal portion of the tool, although initially formed of more than one part, constitutes an integral whole; the head may be of substantial size and entirely cover the outer end of the handle so as to protect the same against being struck; the handle is rigidly secured in place and protected in such manner that the likelihood of the same splitting or cracking is reduced to a minimum; and the joint between the stems which constitute the shank is concealed from view by the handle and the necessity of finishing or polishing this joint is eliminated.

In the accompanying drawing, we have shown, for illustrative purposes, a hand tool which may be constructed by proceeding in accordance with the present invention.

In said drawing:

Figure 1 is a side view of a hand tool with the handle and the upper end of the bolster in longitudinal section; and Fig. 2 is a side view of the metal parts of the hand tool before these parts are united.

Referring to the drawing in detail, and particularly to Fig. 1, $a$ denotes the operative portion of the hand tool, and which portion is here shown, for illustrative purposes, as being in the form of a chisel, although, as stated, it may be shaped to constitute a screw driver or other appropriate tool; $b$ is a bolster portion which may be formed integrally with, or permanently united to, the blade $a$; and $c$ indicates a handle which may be formed of wood or other suitable material and one end of which is tapered and located within the socket formed by the ferrule on the bolster. Extending centrally through the handle is a shank $d$ having on its outer end an enlarged head $e$. Between the head and the outer end of the handle may be provided a leather washer $f$ which serves as a cushion to relieve the handle from shock when the head is struck.

In accordance with the present invention, the shank $d$ is constructed of two pieces or stems 10 and 11 welded together, as at 12 and as hereinafter described more in detail; one of the stems 10 being formed integrally with the bolster and the other stem 11 integrally with the head $e$. In accordance with our method, the handle $c$ is formed with a central longitudinal bore 15 which, if desired, may be of increased diameter for a portion of its length, as indicated by the numeral 15'. The bolster $b$ and the blade $a$ may, if desired, be formed from a single piece of stock. Formed integrally with the bolster is a tapering ferrule 16 and the stem 10 which extends axially up through the ferrule. This stem, preferably, is of a diameter to closely fit in the lower end of the axial bore 15 of the handle so that the handle will have a substantial bearing on this stem.

The knob or head $e$ and the stem 11 may be formed by taking a round piece of stock of suitable length and diameter and swedging the same into the desired shape and length, as shown in Fig. 2. In the present instance, the head is of substantial diameter so that it entirely covers the outer end of the handle and thus protects the same. The stem 11, in the present instance, is made of two diameters, the lower end being substantially of the same diameter as the stem 10 and the upper portion 11' being of a somewhat larger diameter and fitting closely in the enlarged portion 15' of the bore so that the upper end of the handle will have a substantial bearing on this portion 11'.

After the metal parts are suitably formed, the leather washer $f$ may be slipped into place on the stem 11, and this stem then inserted into the handle. The stem 10 is then inserted into the lower end of the bore of the handle and brought into engagement with the lower end of the stem 11. The stems are then welded together, as by passing an electric current through the parts while urging the parts towards one another. It will be noted that the bore of the handle about the welded joint 12 is larger than the diameters of the adjacent ends of the stems 10 and 11, this arrangement being provided in order to allow for the swell or flash formed at the joint by the welding operation and to permit of an air pocket or space between the weld and the handle and thus prevent burning of the latter.

By preference, the bolster $b$, the blade $a$, the stem 10, and the ferrule 16 may be constructed by proceeding in accordance with the method disclosed in U. S. Patent No. 1,139,392, granted May 11, 1915, to George A. Wood, one of the herein named applicants. In this event, a piece or rod of stock will have formed on it, and between its ends, a bolster $b$ and a lateral flange 16' at the upper end of the bolster, as shown in Fig. 2. The flange is then turned into cup shape, as shown in Fig. 1, so as to form a socket, the axis of which is coincident with that of the stem 10. If desired, and as disclosed in said George A. Wood patent, a groove 18, before the flange is turned up to form a socket, may be formed in the bolster about the base of the stem in order to provide a socket of increased depth. The stem 10 may then be inserted into the handle and welded to the stem 11 of the head, as previously described.

It will be noted that, by proceeding in accordance with the present invention, the metal portion of the handle constitutes an integral unit characterized by its strength and durability from one end of the tool to the other. The parts may be economically manufactured and assembled at a relatively low cost.

It is, of course, obvious that my invention is susceptible of various modifications which are within the spirit of the invention without departing from the scope of the following claims, it being understood that the present disclosure is by way of illustration only and it is not to be taken as restrictive of our conception.

We claim as our invention:

1. The process of making a hand tool, which consists in forming a handle with a bore; forming a bolster having at one end an integral ferrule and a stem; forming a head having a stem; inserting said stems into the opposite ends of said bore; and welding the abutting ends of said stems together between the ends of and within said handle.

2. The process of making a hand tool, which consists in forming a handle having a bore; forming a bolster with an integral ferrule at one end and with a stem extending through the socket of said ferrule; forming a head with a stem by swedging a piece of stock to the desired shape and size; inserting the stem of said head in the outer end of the bore of said handle; slipping said handle over said first mentioned stem and into said socket; and passing an electric current through said stems to form an electric weld between their adjacent ends and within and between the ends of said bore of said handle.

3. The process of making a hand tool, which consists in forming a handle with a through bore; forming a bolster having at one end an integral ferrule and a stem extending axially through said ferrule; forming an enlarged head with a stem; inserting said stems into the opposite ends of said bore and bringing them into abutting relation; said stems and bore being formed to provide a space between the wall of the bore and the abutting ends of said stems; and forming between the ends of said handle a weld between said stems by passing an electric current therethrough.

4. The process of making a hand tool; which consists in forming a handle with a through bore one end of which is of larger diameter than the other end; forming a bolster with an integral ferrule and a stem extending through said ferrule; forming a head with a stem having an end portion of substantially the same diameter as the first stem and a portion adjacent said head of substantially the same diameter as the enlarged portion of the bore in the handle; inserting the stems in the respective ends of the bore of said handle; and welding said stems together between the ends of and within said handle by passing a current therethrough.

GEORGE A. WOOD.
GEORGE E. WOOD.